United States Patent [19]

Stange

[11] 4,078,786

[45] Mar. 14, 1978

[54] AUTOMATIC DOCUMENT RECIRCULATION SYSTEM

[75] Inventor: Klaus Karl Stange, Pittsford, N.Y.

[73] Assignee: Xerox Corporation, Stamford, Conn.

[21] Appl. No.: 755,304

[22] Filed: Dec. 29, 1976

[51] Int. Cl.$^2$ ............................................. B65H 5/22
[52] U.S. Cl. ......................................... 271/3; 271/9; 353/25; 355/40; 355/75
[58] Field of Search ............... 271/3, 64, 9; 312/268, 312/185, 186, 191, 97; 353/25; 355/75, 76, 40–45; 198/801, 644, 653, 694, 695

[56] References Cited

U.S. PATENT DOCUMENTS

| | | | |
|---|---|---|---|
| 3,578,143 | 5/1971 | Woodward | 271/173 X |
| 3,632,195 | 1/1972 | Strimling | 353/25 |
| 3,659,837 | 5/1972 | Umahashi | 271/9 |

*Primary Examiner*—Richard A. Schacher

[57] ABSTRACT

An automatic recirculating document handler for use in conjunction with a document reproduction machine wherein each document to be reproduced is retained on a separate, planar carrier, the carriers being recirculated with the documents thereon to prevent wear or damage of the original documents as is common with recirculating document handlers wherein the documents themselves are acted upon by the recirculating mechanisms.

3 Claims, 7 Drawing Figures

AUTOMATIC DOCUMENT RECIRCULATION SYSTEM

BACKGROUND OF THE INVENTION

With the advent of high speed copiers, for example xerographic reproduction machines, the need for mechanisms to automatically present documents to the copier to be copied and for "finishing" or manipulating the output of the copier in such a manner as to simplify operator involvement was recognized. To meet this demand a number of document handlers have been offered which physically separate individual documents from a stack of documents to be copied, present the separated document to the platen of the copy machine for copying and thereafter return the copied document to the document stack. In separating and manipulating the original documents, extreme care must be taken to prevent undue wear and tear or mutilation of the original document. Even with the most sophisticated mechanisms presently available, occasional misfeeds, multifeeds and/or document jams may be encountered. In view of this, it has been the practice to present each document to the copy machine and produce a number of copies of each document, which copies are routed to a multibin collator to provide collated output which can be easily stapled or bound by the machine operator. While the use of collators greatly reduces the amount of document handling necessary, the collators required for high volume copies are both large and expensive. Obviously the least expensive way of producing collated output requires continuous recirculation of the original documents such that one complete copy of the original document set is produced for each circulation of the original document in the document handler. However, it can be seen that unless extreme care is taken, in instances where hundreds of sets are necessary, recirculation of the original documents the required hundreds of times will eventually cause wear and/or damage to the document, no matter how carefully they are handled if the documents themselves are being manipulated by the mechanisms.

It is therefore an object of the present invention to provide an automatic document handler wherein the documents to be copied are placed in suitable planar carriers, which carriers are adapted for manipulation by the document handler mechanisms, the document being accurately located and maintained on the carriers as the carriers are recirculated past the copying station of the machine.

SUMMARY OF THE INVENTION

The subject invention relates to an automatic document handler adapted for use with a high speed copy reproduction machine, the document handler including a plurality of document receiving trays each having a planar surface thereon. Holddown means are associated with each tray to maintain documents to be copied on the planar surface of the tray, and means are provided for sequentially moving the trays to the exposure station of the reproduction machine for exposure of the documents thereon.

DESCRIPTION OF THE PREFERRED EMBODIMENT

Figure 1:
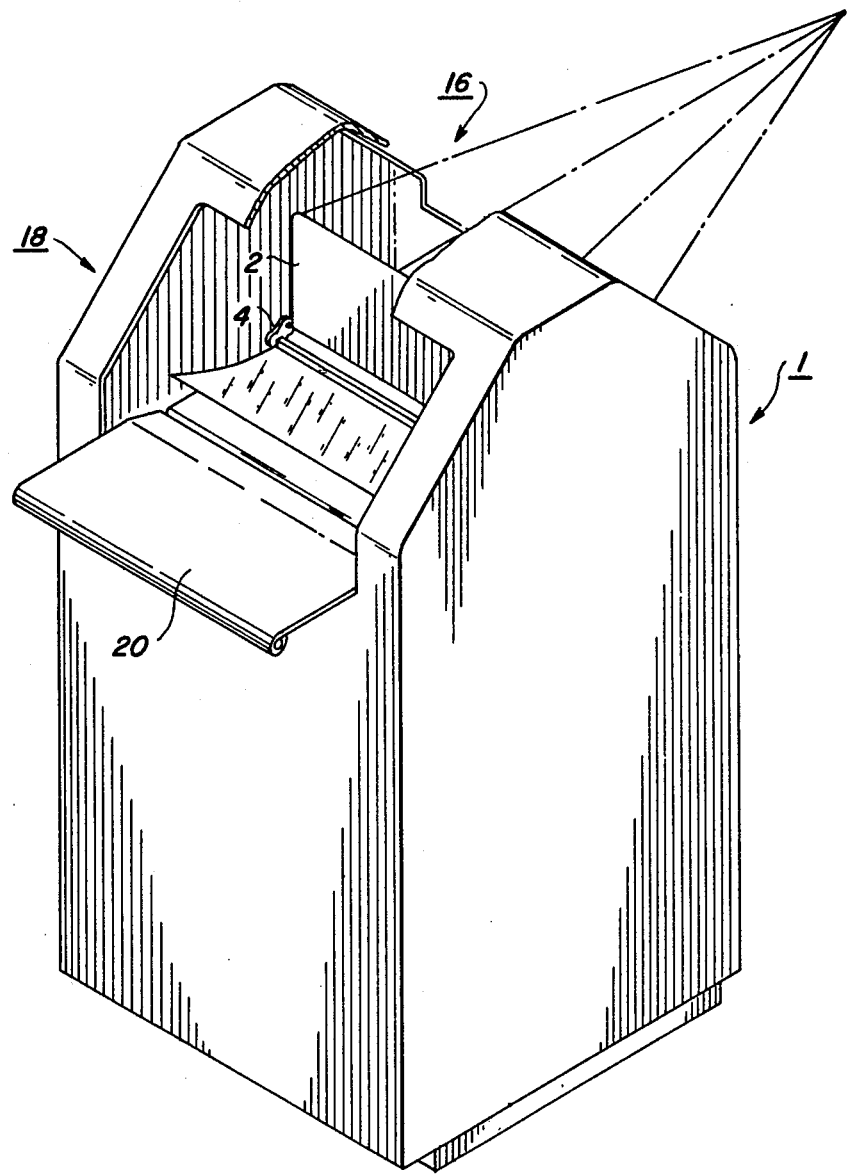
FIG. 1 is a perspective view of an automatic document handler for use with a high speed copy reproduction machine, the document handler having portions broken away to illustrate internal components thereof.
Figure 2:
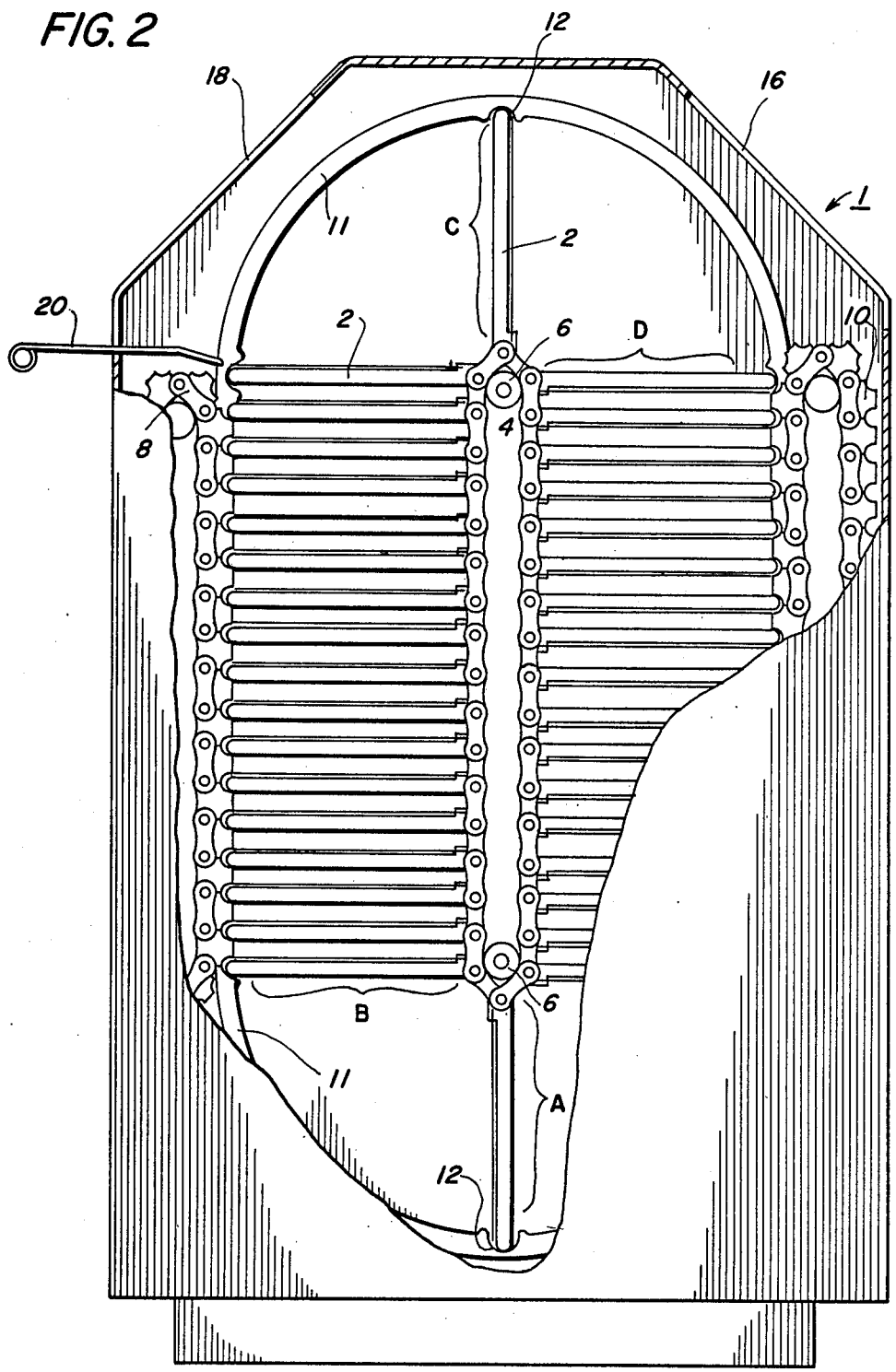
FIG. 2 is a side elevation view in section of the automatic document handler illustrated in FIG. 1.

Referring to FIGS. 1 and 2, there is illustrated an automatic document handler adapted for use with a high speed copy machine. The document handler is preferably mounted in a cabinet 1 to enclose the moving elements thereof. The document handler comprises a plurality of planar document trays 2, one end of each tray being permanently attached to a suitable mechanism such as a chain 4 which is supported on sprockets 6 which are adapted to be driven by a suitable motor (not shown). The opposite end of each tray 2 is adapted for cooperation with suitable chain-type tray retainers 8 and 10 which are adapted to be driven in unison with chain member 4 to maintain the trays parallel through the majority of the travel path within the automatic document handler. At the top and bottom of the document handler there is provided wheel-like tray retainer devices 11 adapted to receive the outer ends of the document trays in suitable recesses 12 to swing the trays through 90° for each incremental movement of the chain 4 and corresponding movement of chains 8 and 10, thereby moving the trays from a horizontal position to a vertical position at the top and bottom of the document handler. While the document handler of the present invention is illustrated in a vertical orientation such that the documents on the document trays are exposed while in the vertical location, it should be understood that due to the positive retention of documents on the document trays as will be explained hereinafter, the document handler could be oriented 90° from that illustrated so that the trays normally reside in a vertical orientation and are moved to a horizontal orientation for exposure. As can be seen from FIGS. 1 and 2, when the document tray is at the upper position in the document handler, the document can be exposed through a suitable opening 16 in the document handler case to enable reproduction of the document on the tray. While FIG. 2 illustrates the preferred location for exposing the document on the document trays, it should be understood that depending upon the construction of the reproduction machine with which the automatic document handler will be utilized, by providing suitable openings in the cabinet, exposure could be accomplished at the bottom of the automatic document handler at tray positions A or B, or at the top of the automatic document handler at the preferrred position C, or at position D. Further by utilizing a tray design illustrated in FIG. 5, exposure could be accomplished at position A or position C from either or both sides of the document tray as will be explained hereinafter.

Figure 3:
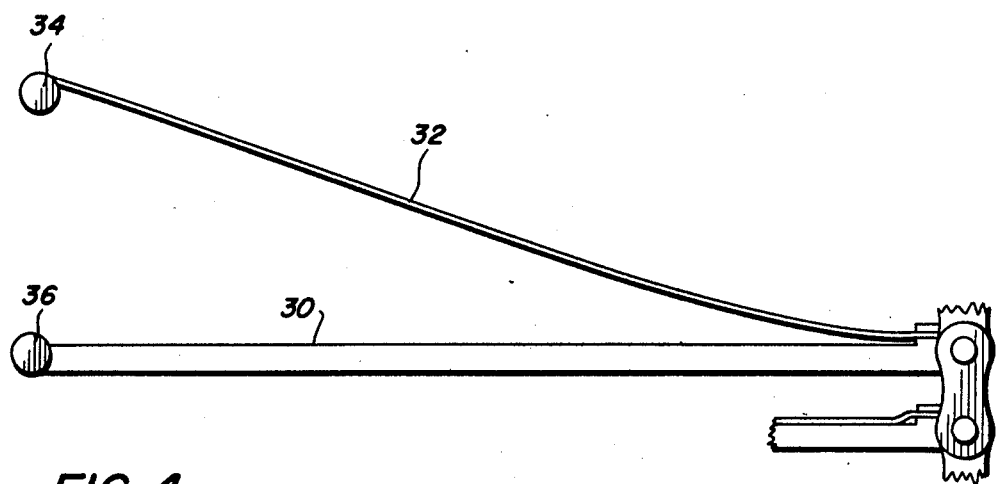
FIG. 3 is a sectional view of a first embodiment of a document tray in section utilized with the document handler of FIGS. 1 and 2.
Figure 4:
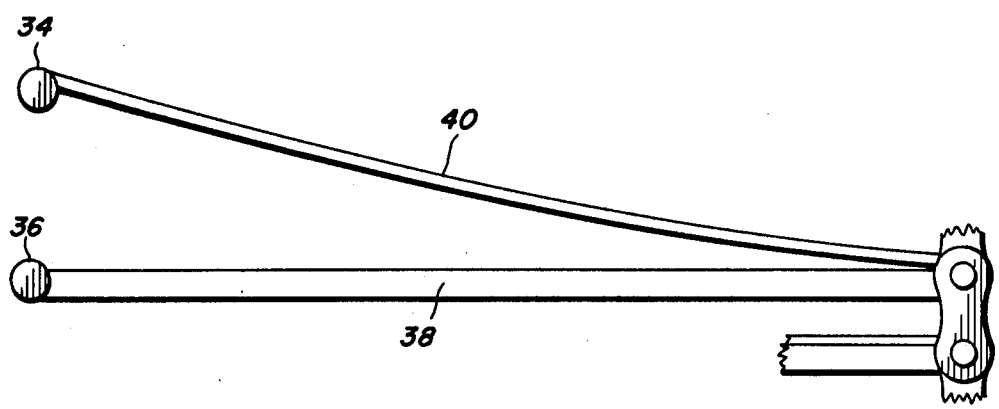
FIG. 4 is a second embodiment of a document tray which can be utilized in the automatic document handler of FIGS. 1 and 2.
Figure 5:
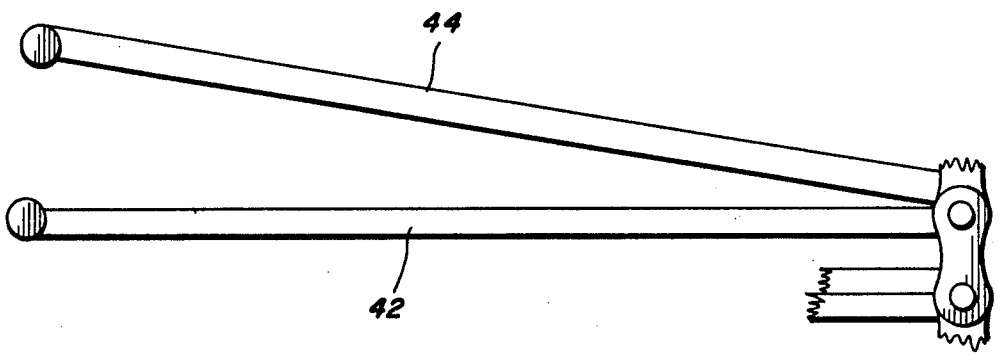
FIG. 5 is a further embodiment of a document tray in section which can be utilized in the document handler of FIGS. 1 and 2.

Referring to FIG. 1 there is illustrated an operator loading station 18 whereat, due to the construction of the document handler, the individual trays are horizontal thereby allowing accurate positioning of documents to be copied on the tray. In FIG. 1 the document tray 2 is illustrated with a plurality of perforations therein, the tray being constructed in such a manner that a vacuum plenum is incorporated therein to enable retention of the document on the tray by vacuum rather than by physical covers as illustrated in FIGS. 3-5. After the document is properly positioned on the tray 2 and, if the document handler employs trays of the type illustrated in FIGS. 3-5, the tray covers are closed thereover, the document handler mechanism would be indexed one step to present the subsequent tray at the loading station for loading the next page of the document set thereon, which action would be repeated until all of the documents to be copied are loaded into the document handler. Following complete loading of the document set, the document handler loading door 20, which may serve as a loading worktable during the loading operation, may be closed and the reproduction machine programmed to produce the required number of copies of the document set loaded in the machine. The copies would be made by sequentially moving each tray to the exposure station and exposing the documents in sequence the required number of times to produce the preselected number of document sets. Depending upon the number of documents loaded in the document handler, the document handler may operate in a single direction i.e. clockwise, or if a small number of documents are loaded, rather than requiring sequencing of the document handler through the entire cycle, the document handler could be reversed to bring the first copy of the set back to the exposure station after which the document handler would again be operated in the forward direction. Referring to FIGS. 3, 4 and 5 there is illustrated document tray constructions which may be preferred over the vacuum tray illustrated in FIG. 1. FIG. 3 illustrates a document tray 20 formed of a rigid metal or plastic sheet 30 which is provided with a transparent plastic cover 32 adapted to overlie the document on the tray to hold the document in position throughout the recirculation cycle within the document handler. The end of the transparent cover may be provided with latch means such as an enlarged rod-like portion 34 adapted for mating engagement with an enlarged section 36 formed on the document tray for engagement with the recessed portions 37 formed in chains 8 and 10 to maintain the free ends of the trays in proper position. With the tray construction illustrated in FIG. 3, it may be desirable to provide a flat white surface on the tray to prevent printout of the portions of the tray extending beyond the document placed thereon.

FIG. 4 illustrates a tray construction wherein the tray itself if formed of a rigid, transparent glass or plastic material 38 while the cover is formed of a semi-rigid material 40 having a white surface thereon. Suitable ends 34 and 36 are provided on the cover and tray respectively for the reasons stated in the description of FIG. 3 above. With the construction of FIG. 4, the document would be placed face-down on the tray and exposure would be accomplished through the bottom of the tray rather than through the cover of the tray as in FIG. 3.

FIG. 5 illustrates a document tray 42 and document cover 44 both formed of a rigid transparent material such as glass or plastic wherein exposure could be accomplished through the cover or through the tray sequentially or simultaneously, assuming the copy reproduction machine had the necessary optics and copy capability for sequential or simultaneous copying of duplex documents.

Figure 6:
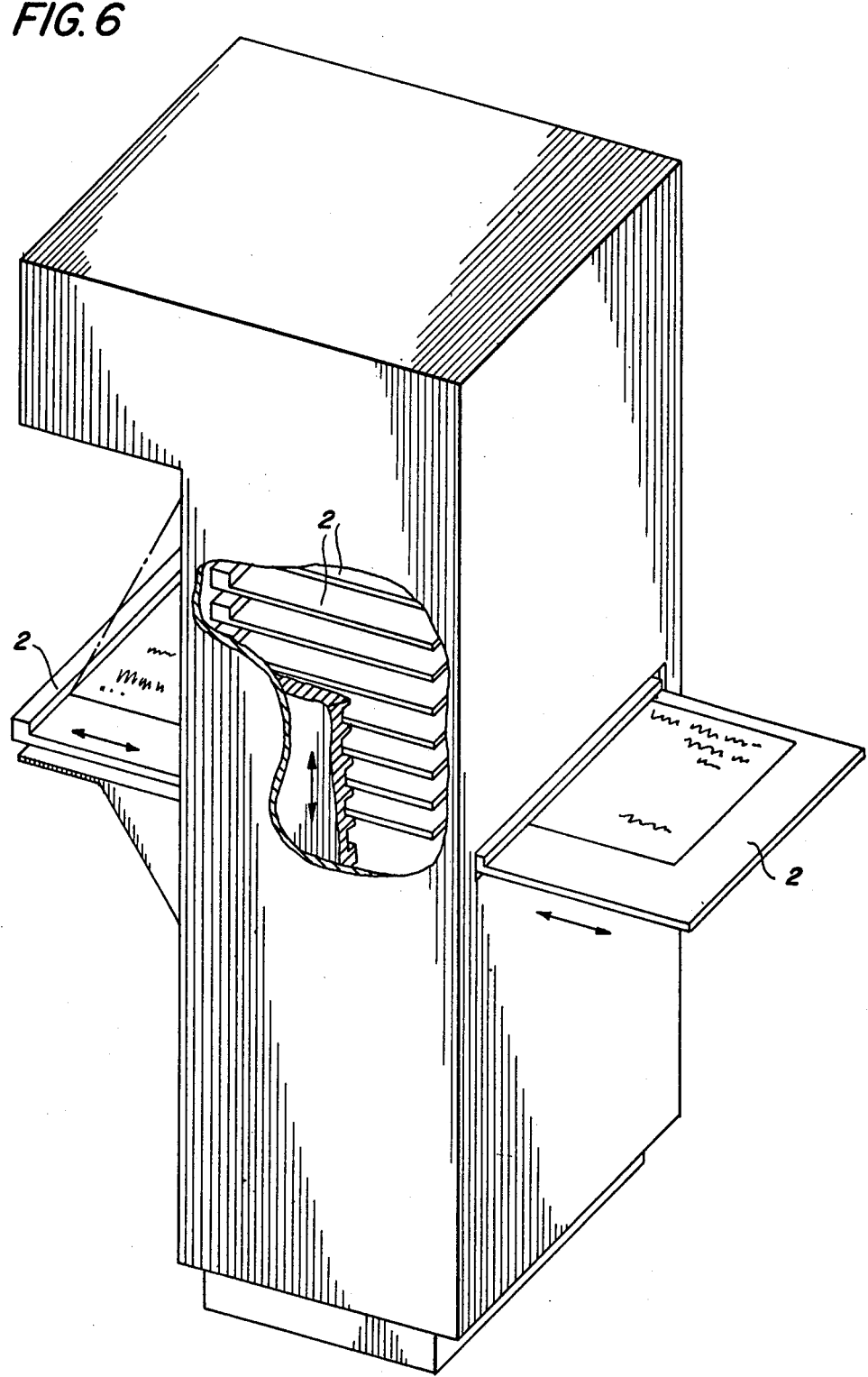
FIG. 6 is a perspective view having portions broken away of a second embodiment of the document handler wherein the document trays are adapted for straight up and down movement with lateral displacement at the exposure station; and, FIG. 7 is a perspective view of a third embodiment of the document handler wherein the document trays are mounted in a carousal and adapted for axial movement at the exposure station.

Referring particularly to FIG. 6 there is illustrated a second embodiment of the document tray recirculating device wherein the trays are adapted to be moved in a straight up and down motion by suitable means, such as a rack. At the exposure station illustrated at the left of the drawing in FIG. 6, the trays are adapted for movement in a lateral direction to enable exposure of the document on an individual tray. At the right of the embodiment illustrated in FIG. 6, preferably at the same level as the exposure station on the left, there is provided a means for moving the racks outwardly to enable loading of documents thereon. It should be understood that the various types of document racks illustrated in FIGS. 3, 4 and 5 could be utilized in the embodiment of FIG. 6 to enable exposure from the top, bottom or both sides of the document tray. Further, due to the lateral displacement of the documents at the exposure station, the embodiment illustrated in FIG. 6 would be particularly well suited for a reproduction machine having slit scan exposure, the movement of the document tray over the exposure station being controlled in synchronization with the photoreceptor of the copy machine to enable exposure thereof as is well known in the art.

Figure 7:
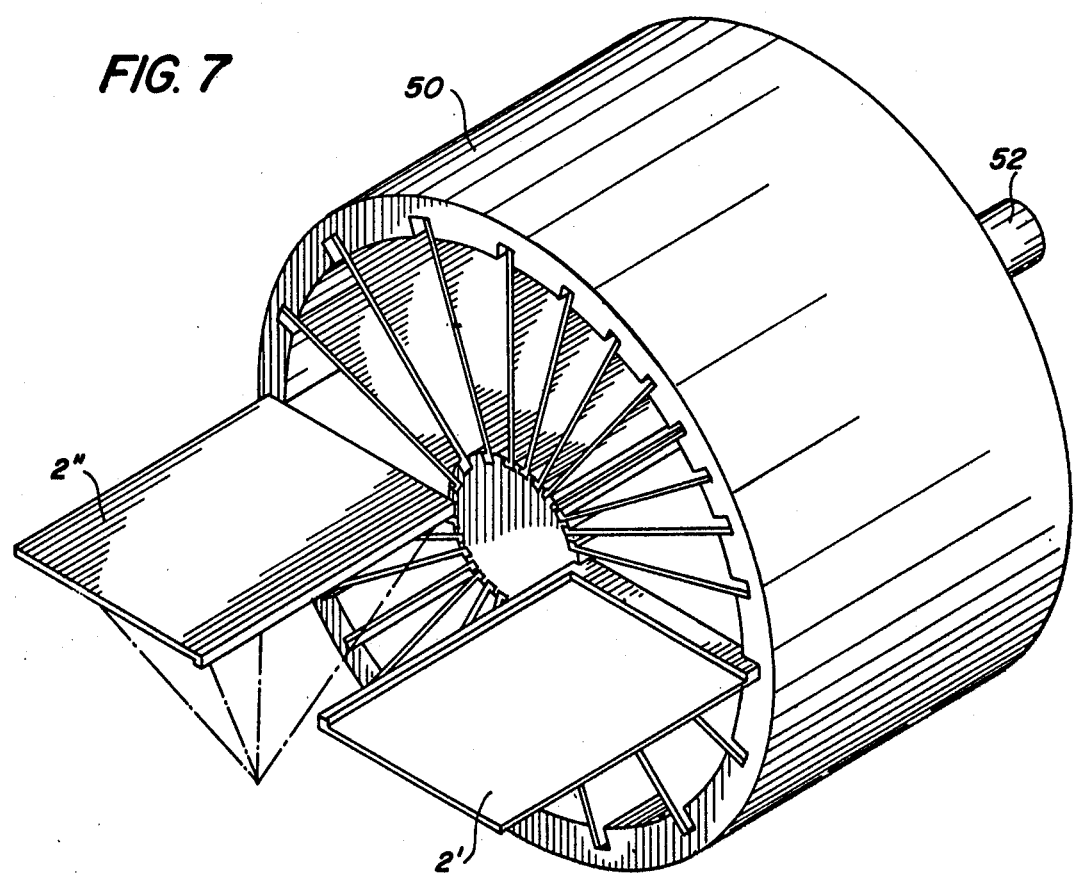

Referring to FIG. 7, there is illustrated a third embodiment of applicant's document handler wherein the document trays 2 are mounted in a cylindrical carousal 50, the carousal being adapted for rotation about an axle 52 to circulate the documents thereon to the exposure station of a reproduction machine. At the exposure station or the loading station, the trays would be adapted for movement in an axial direction to allow loading or exposure thereof. In the illustrated embodiment, tray 2' is shown extended from the carousal at a loading station while the tray 2" is shown extended from the carousal at the exposure station, the actual reproduction machine not being shown for clarity.

It should be understood that the document racks illustrated in FIGS. 6 and 7 could be moved up and down or laterally by rack and pinions or other suitable well known mechanical devices.

From the foregoing it can be seen that an automatic document handler is provided which allows for extremely accurate positioning of documents within the document handler and provides for unlimited recirculation of the document to provide a large number of sets without requiring physical contact of the documents by the numerous feed wheels, belts and rollers found in the majority of document handlers available today.

While the invention has been described with reference to the structure disclosed, it is not confined to the details set forth, but is intended to cover such modifications or changes as may come within the scope of the following claims.

What is claimed is:

1. An automatic document handler adapted for circulation of documents past the exposure station of a high speed copy reproduction machine, the document handler including:

a plurality of document receiving trays, each having a planar surface thereon;

said trays comprising rigid opaque plates;

holddown means comprising transparent plastic covers adapted to overlie documents placed on said plates to hold the documents in position thereon, documents being adapted for exposure through said transparent cover; and means for sequentially moving said trays to the exposure station of the reproduction machine for exposure of the documents thereon.

2. An automatic document handler adapted for circulation of documents past the exposure station of a high speed copy reproduction machine, the document handler including:

a plurality of document receiving trays, each having a planar surface thereon;

said trays being formed of a transparent glass plate;

holddown means comprising a semi-rigid cover having a white surface thereon adapted to overlie documents placed on said glass plates to hold the documents in position thereon, the documents being adapted for exposure through said glass plate; and means for sequentially moving said trays to the exposure station of the reproduction machine for exposure of the documents thereon.

3. An automatic document handler adapted for circulation of documents past the exposure station of a high speed copy reproduction machine, the document handler including:

a plurality of document receiving trays, each having a planar surface thereon;

said trays being formed of a transparent glass plate;

holddown means comprising a mating transparent glass plate adapted to overlie documents placed on said trays to hold the documents in position thereon, the documents being adapted for exposure through said cover and said tray; and means for sequentially moving said trays to the exposure station of the reproduction machine for exposure of the documents thereon.

* * * * *